US012136765B2

(12) United States Patent
Hiramatsu et al.

(10) Patent No.: US 12,136,765 B2
(45) Date of Patent: Nov. 5, 2024

(54) ANTENNA, WIRELESS COMMUNICATION MODULE, PACKAGE RECEIVING APPARATUS, AND PACKAGE RECEIVING SYSTEM

(71) Applicant: KYOCERA CORPORATION, Kyoto (JP)

(72) Inventors: Nobuki Hiramatsu, Yokohama (JP); Hikaru Nekozuka, Yokohama (JP); Gen Matsui, Tokyo (JP); Kenji Tachibatake, Hirakata (JP)

(73) Assignee: KYOCERA CORPORATION, Kyoto (JP)

( * ) Notice: Subject to any disclaimer, the term of this patent is extended or adjusted under 35 U.S.C. 154(b) by 141 days.

(21) Appl. No.: 17/905,765

(22) PCT Filed: Mar. 10, 2021

(86) PCT No.: PCT/JP2021/009663
§ 371 (c)(1),
(2) Date: Sep. 7, 2022

(87) PCT Pub. No.: WO2021/193077
PCT Pub. Date: Sep. 30, 2021

(65) Prior Publication Data

US 2023/0110878 A1 Apr. 13, 2023

(30) Foreign Application Priority Data

Mar. 27, 2020 (JP) ................................ 2020-059068

(51) Int. Cl.
*H01Q 15/00* (2006.01)
*H01Q 1/22* (2006.01)

(52) U.S. Cl.
CPC ............ *H01Q 15/006* (2013.01); *H01Q 1/22* (2013.01)

(58) Field of Classification Search
CPC .... H01Q 1/22; H01Q 15/0006; H01Q 15/006; H01Q 15/0066; H01Q 15/0073; H01Q 15/008; H01Q 15/0086
See application file for complete search history.

(56) References Cited

U.S. PATENT DOCUMENTS 10,103,445 B1 * 10/2018 Gregoire ................ H01Q 21/08
11,309,620 B2 * 4/2022 Ji ......................... H01Q 15/008
(Continued)

FOREIGN PATENT DOCUMENTS

JP H11104005 A 4/1999
JP 2009084837 A 4/2009
(Continued)

OTHER PUBLICATIONS

Uchimura Hiroshi et al., "Multi-band antenna installable on metal", Lecture proceedings of the 2020 general conference of IEICE: Communication 1, 2020, 3pp.

*Primary Examiner* — Dameon E Levi
*Assistant Examiner* — Leah Rosenberg
(74) *Attorney, Agent, or Firm* — HAUPTMAN HAM, LLP

(57) ABSTRACT

An antenna includes an antenna body and a housing case. The antenna body configured to enter a first mode exhibiting an artificial magnetic conductor character with respect to an electromagnetic wave in a first frequency band and configured to enter in a second mode (TM mode) serving as a resonator for the electromagnetic wave in a second frequency band higher than the first frequency band. The housing case includes a bottom plate on which the antenna body is installed and a side wall provided standing from the bottom plate and spaced with a distance from a periphery of the antenna body. The housing case is a case made of metal
(Continued)

including an opening in a face through which the electromagnetic wave enters and exits.

10 Claims, 17 Drawing Sheets

(56) References Cited

U.S. PATENT DOCUMENTS

| | | | | |
|---|---|---|---|---|
| 2013/0265205 | A1 | 10/2013 | Okano et al. | |
| 2017/0133762 | A1* | 5/2017 | Ng | H01Q 1/42 |
| 2017/0365931 | A1* | 12/2017 | Martel | H01Q 15/0086 |
| 2019/0326678 | A1* | 10/2019 | Uchimura | H01Q 9/0414 |
| 2019/0386392 | A1* | 12/2019 | Boutayeb | H01Q 21/0031 |
| 2020/0350687 | A1 | 11/2020 | Fujishiro et al. | |
| 2021/0057799 | A1 | 2/2021 | Isoyama et al. | |
| 2021/0194118 | A1* | 6/2021 | Hiramatsu | H01Q 1/24 |
| 2022/0384952 | A1* | 12/2022 | Uchimura | H01Q 15/0013 |
| 2023/0128565 | A1* | 4/2023 | Yoshikawa | H01Q 9/0407 343/872 |
| 2023/0275349 | A1* | 8/2023 | Hiramatsu | H01Q 1/42 343/702 |

FOREIGN PATENT DOCUMENTS

| | | | |
|---|---|---|---|
| JP | 2012105189 | A | 5/2012 |
| WO | 2019142678 | A1 | 7/2019 |
| WO | 2019142679 | A1 | 7/2019 |

* cited by examiner

ANTENNA, WIRELESS COMMUNICATION MODULE, PACKAGE RECEIVING APPARATUS, AND PACKAGE RECEIVING SYSTEM

The present application is a National Phase of International Application Number PCT/JP2021/009663 filed on Mar. 10, 2021, which claims the benefit of priority from Japanese Patent Application No. 2020-059068, filed on Mar. 27, 2020.

TECHNICAL FIELD

The present disclosure relates to an antenna, a wireless communication module, a package receiving apparatus, and a package receiving system.

BACKGROUND ART

An example of a known antenna is a dipole antenna (see, for example, PTL 1). The dipole antenna of PTL 1 includes a radiation element and a reflective element disposed in parallel to each other inside a magnetic material. The radiation element and the reflective element have a folded dipole structure including a dipole element whose both ends are folded.

CITATION LIST

Patent Literature

PTL 1: JP 2012-105189

SUMMARY OF INVENTION

Technical Problem

The dipole antenna when installed on metal may have a reduced input impedance or a narrower frequency band, degrading the antenna characteristics.

An object of the present disclosure is to provide an antenna that can suppress the degradation of the antenna characteristics when installed on metal, a wireless communication module, a package receiving apparatus, and a package receiving system.

Solution to Problem

An antenna according to an aspect includes an antenna body configured to enter a first mode exhibiting an artificial magnetic conductor character with respect to an electromagnetic wave in a first frequency band and enter in a second mode serving as a dielectric resonator for the electromagnetic wave in a second frequency band higher than the first frequency band and a housing case including a bottom plate on which the antenna body is installed and a side wall provided standing from the bottom plate and spaced with a distance from a periphery of the antenna body, the housing case being made of metal and including an opening in a face through which the electromagnetic wave enters and exits.

A wireless communication module according to an aspect includes the antenna described above and an RF module housed in the housing case and electrically connected to the antenna body.

A package receiving apparatus according to an aspect includes the wireless communication module described above a package receiving box provided with the wireless communication module and configured to house a package, and a controller electrically connected to the wireless communication module and configured to manage the package housed in the package receiving box.

A package receiving system according to an aspect includes the package receiving apparatus described above and a communication apparatus configured to receive package information wirelessly transmitted from the package receiving apparatus.

Advantageous Effects of Invention

According to the present disclosure, the degradation of the antenna characteristics can be suppressed when the antenna is installed on metal.

DESCRIPTION OF EMBODIMENTS

An embodiment according to the present disclosure will be described in detail with reference to the drawings. In the following description, similar components may be denoted by the same reference signs. Redundant descriptions may be omitted. Description and illustration of matters that are not closely related to the description of the embodiment according to the present disclosure may be omitted. Note that the present disclosure is not limited by the following embodiment. The following embodiment includes what can be easily conceived by a person skilled in the art, what is substantially the same, or what is in a so-called equivalent range.

Embodiment

Figure 1:
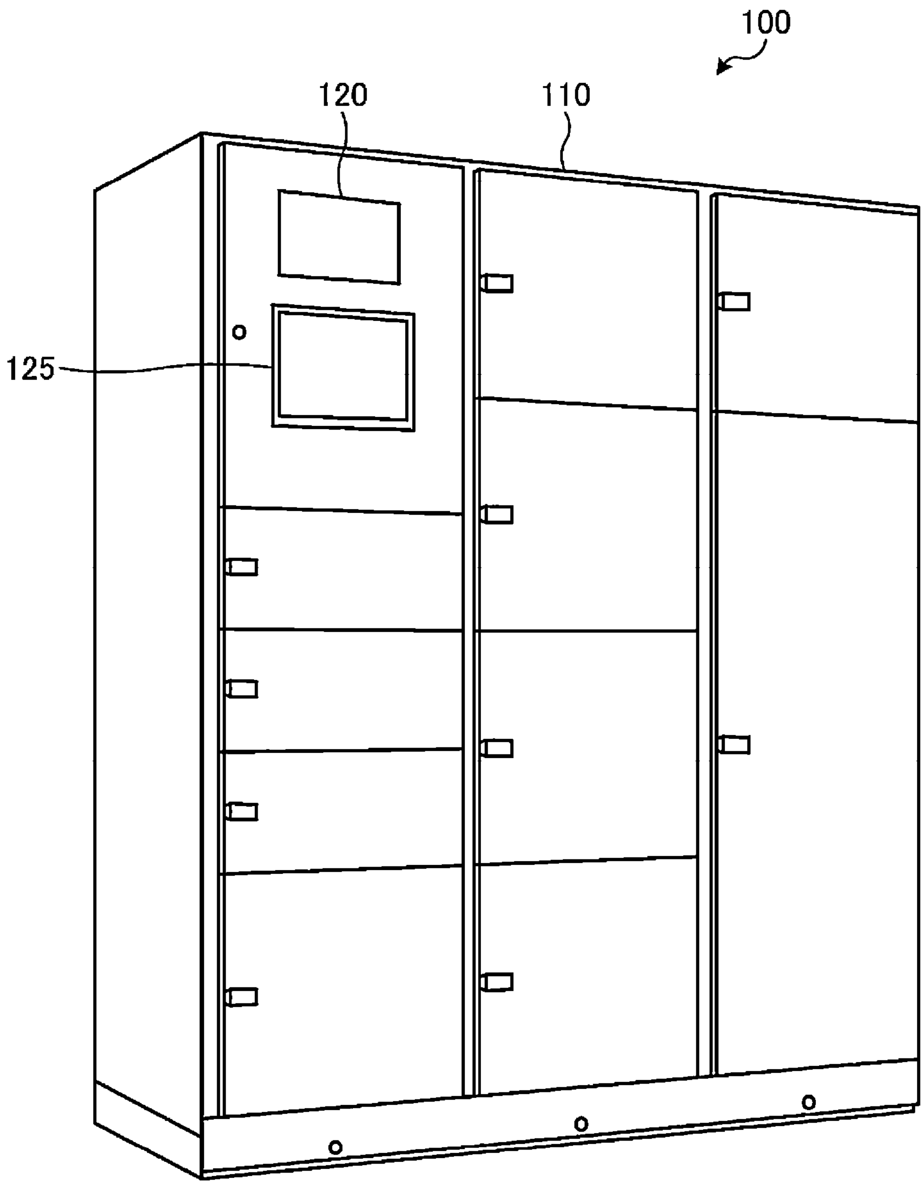
FIG. 1 is a perspective view of a package receiving apparatus according to an embodiment.
Figure 2:
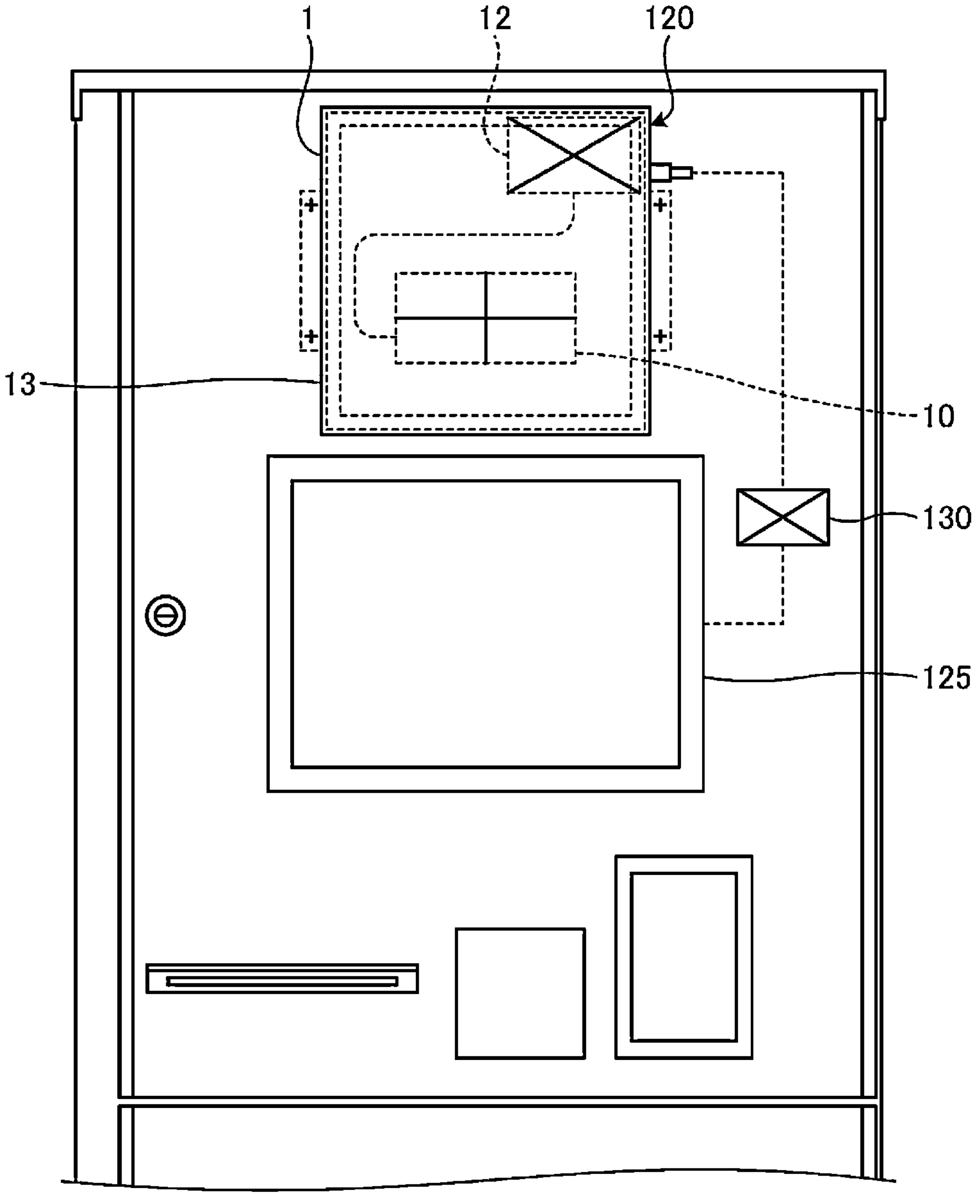
FIG. 2 is a front view illustrating part of the package receiving apparatus.

FIG. 1 is a perspective view of a package receiving apparatus according to an embodiment. FIG. 2 is a front view illustrating part of the package receiving apparatus. A package receiving apparatus 100 is a system that receives and stores a package that is delivered by a deliverer and is to be received by a receiver. Examples of the package include mail and delivered articles. The package receiving apparatus 100 is, for example, a delivery locker having storage and management functions.

As illustrated in FIG. 1 and FIG. 2, the package receiving apparatus 100 includes a package receiving box 110, a wireless communication module 120, a display unit 125, and a controller 130. The package receiving box 110 includes a plurality of storages for storing packages. Each storage of the package receiving box 110 is accessed from a front side thereof by a deliverer to store a package. Further, each storage of the package receiving box 110 is accessed from, for example, the front side thereof by a receiver to pick up the package. The wireless communication module 120 can bidirectionally and wirelessly communicate with an outside. The display unit 125 is provided in the front side of the package receiving box 110. The display unit 125 is, for example, a display device such as a liquid crystal display.

The controller 130 comprehensively controls the operation of the package receiving apparatus 100 to implement various functions. The controller 130 includes an integrated circuit such as a central processing unit (CPU). The controller 130 is electrically connected to the wireless communication module 120. The controller 130 wirelessly communicates with an external via the wireless communication module 120. Specifically, the controller 130 controls to manage the package stored in the package receiving box 110. The controller 130 communicates with the outside via the wireless communication module 120 to exchange information for managing the package. The controller 130 controls the display unit 125 to display a screen that provides the information for managing the package.

Figure 3:
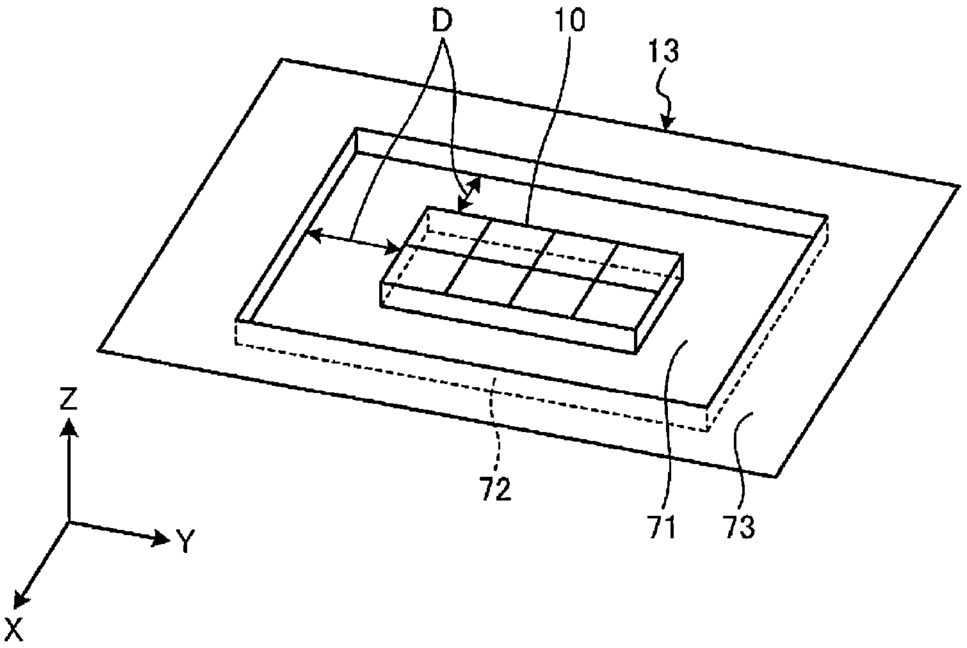
FIG. 3 is a perspective view of an antenna according to the embodiment.
Figure 4:
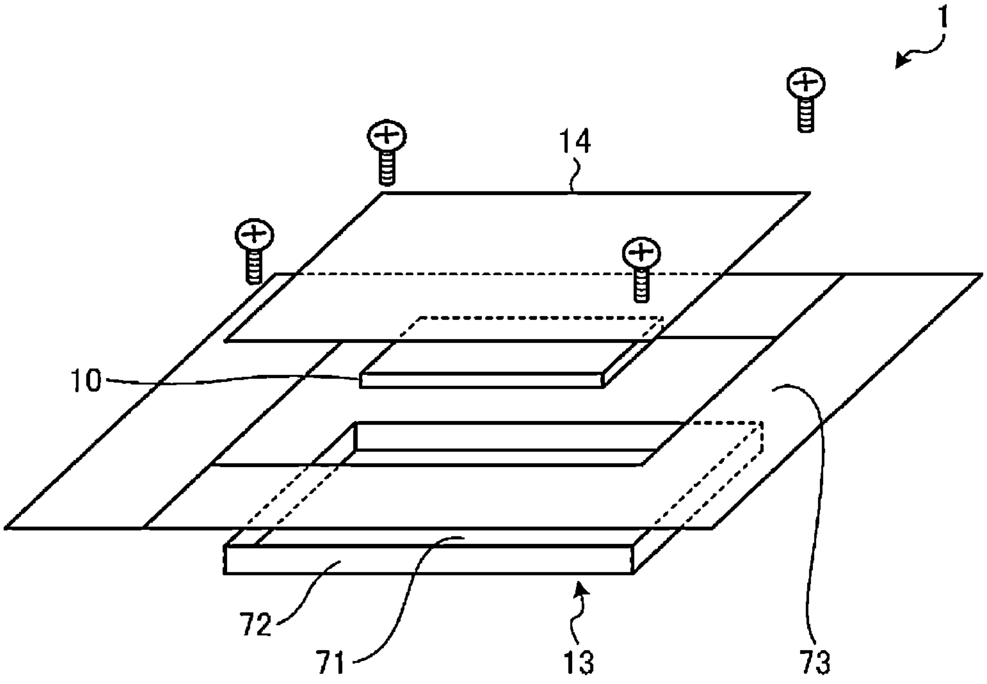
FIG. 4 is an exploded perspective view of the antenna according to the embodiment.

Next, the wireless communication module 120 will be described with reference to FIG. 1 to FIG. 4. FIG. 3 is a perspective view of an antenna according to the embodiment. FIG. 4 is an exploded perspective view of the antenna according to the embodiment. The wireless communication module 120 is provided in the front of the package receiving box 110. The wireless communication module 120 includes an antenna 1 and an RF module 12. The antenna 1 includes an antenna body 10, a housing case 13, and a cover 14. The RF module 12 is housed in the housing case 13 and is electrically connected to the antenna body 10.

Figure 5:
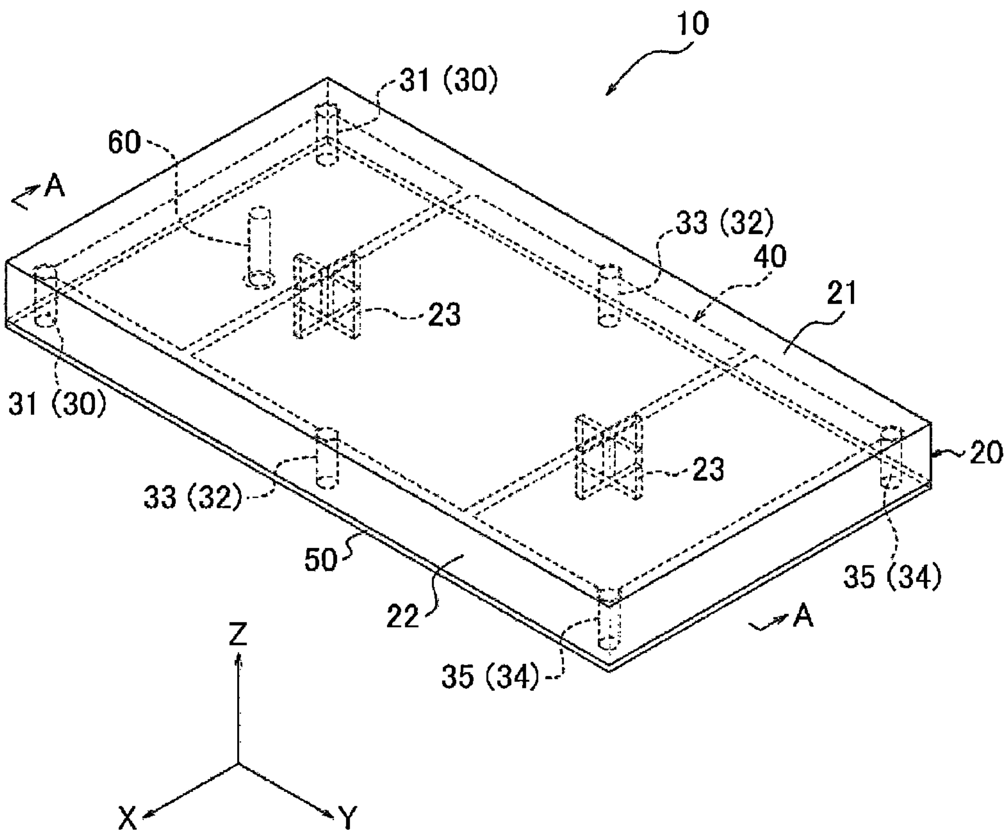
FIG. 5 is a perspective view of an antenna body according to the embodiment.
Figure 6:
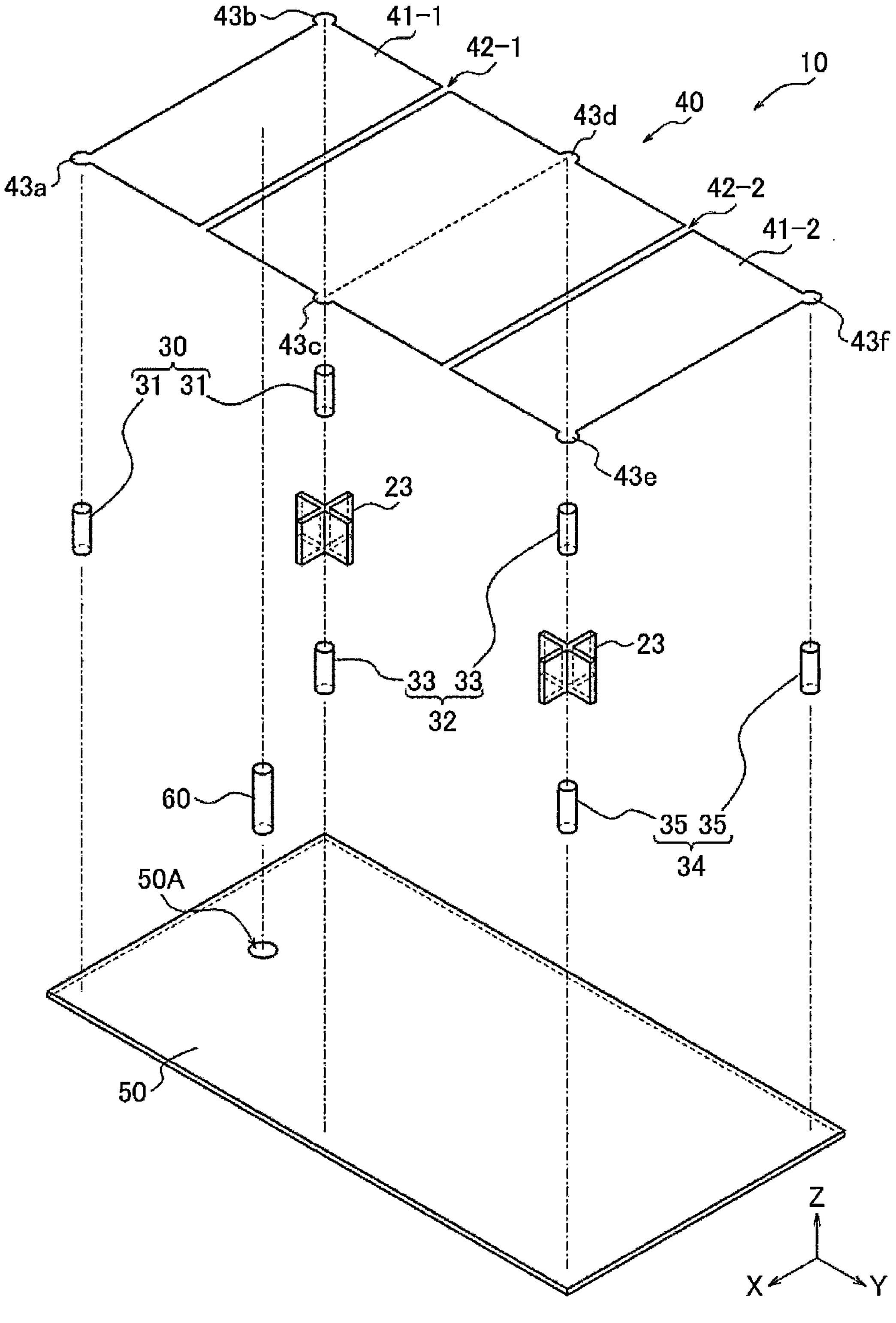
FIG. 6 is an exploded perspective view of part of the antenna body illustrated in FIG. 5.
Figure 7:
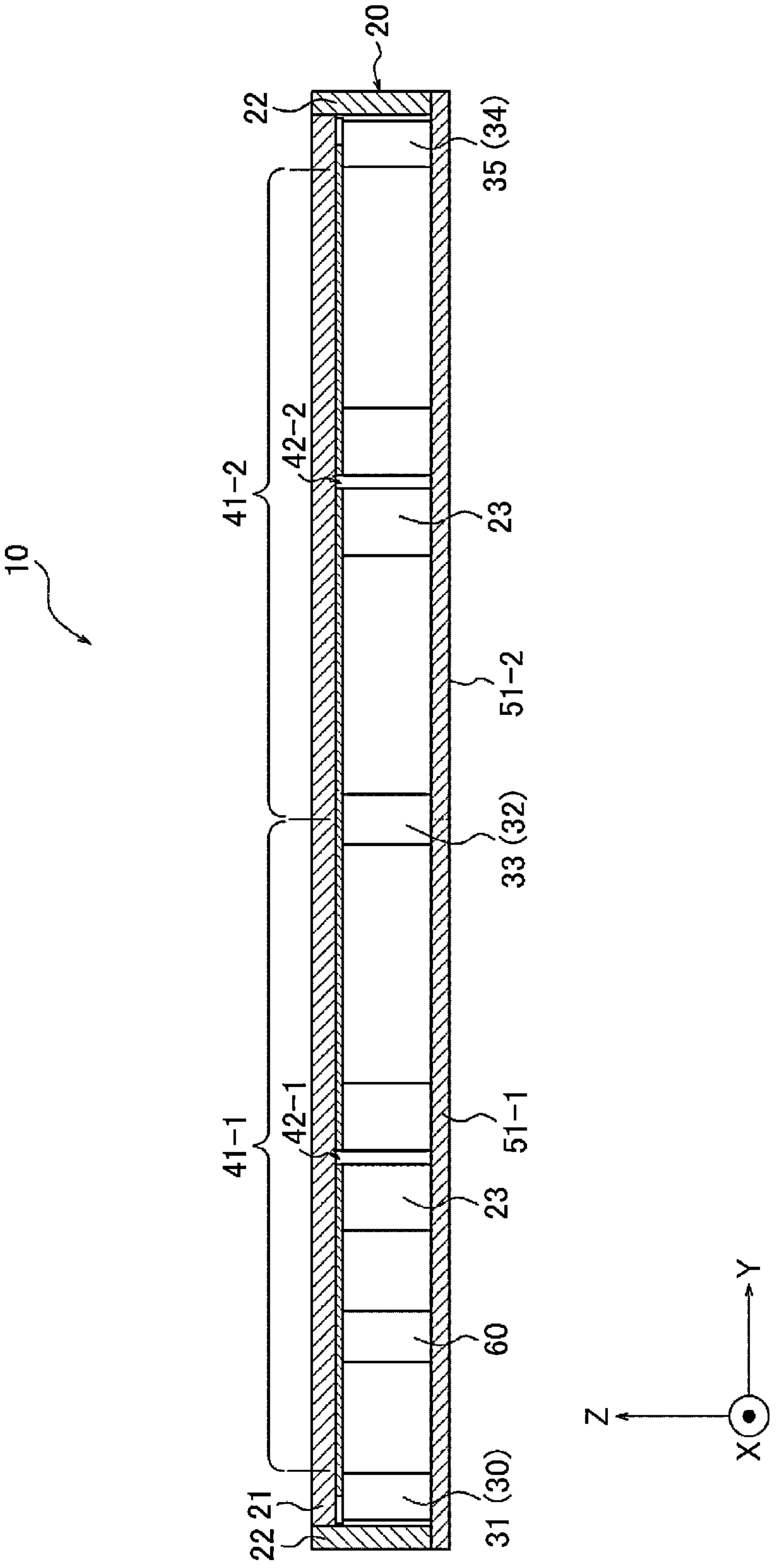
FIG. 7 is a cross-sectional view of the antenna body illustrated in FIG. 5 taken along line A-A.

The antenna body 10 will be described with reference to FIG. 5 to FIG. 13. FIG. 5 is a perspective view of the antenna body according to the embodiment. FIG. 6 is an exploded perspective view of part of the antenna body illustrated in FIG. 5. FIG. 7 is a cross-sectional view of the antenna body illustrated in FIG. 5 taken along line A-A.

The following description employs an XYZ coordinate system. Hereinafter, in a case where an X axis positive direction and an X axis negative direction are not particularly distinguished, the X axis positive direction and the X axis negative direction are collectively referred to as an "X direction." In a case where a Y axis positive direction and a Y axis negative direction are not particularly distinguished, the Y axis positive direction and the Y axis negative direction are collectively referred to as a "Y direction." In a case where a Z axis positive direction and a Z axis negative direction are not particularly distinguished, the Z axis positive direction and the Z axis negative direction are collectively referred to as a "Z direction."

As illustrated in FIG. 5 and FIG. 6, the antenna body 10 includes a base 20, a first connection conductor group 30, a second connection conductor group 32, a third connection conductor group 34, a first conductor 40, a second conductor 50, and a feed line 60. The first connection conductor group 30, the second connection conductor group 32, the third connection conductor group 34, the first conductor 40, the second conductor 50, and the feed line 60 may include the same conductive material or different conductive materials.

The "conductive material" in the present disclosure may include any of a metal material, an alloy of metal materials, a cured material of metal paste, and a conductive polymer as a composition. Examples of the metal material include copper, silver, palladium, gold, platinum, aluminum, chrome, nickel, cadmium lead, selenium, manganese, tin, vanadium, lithium, cobalt, and titanium. The alloy includes a plurality of metal materials. The metal paste includes a powder of a metal material kneaded with an organic solvent and a binder. Examples of the binder include an epoxy resin, a polyester resin, a polyimide resin, a polyamide-imide resin, and a polyetherimide resin. Examples of the conductive polymer include a polythiophene polymer, a polyacetylene polymer, a polyaniline polymer, and a polypyrrole polymer.

The antenna body 10 may exhibit an artificial magnetic conductor character with respect to the electromagnetic wave in a predetermined frequency that is incident on a plane where the first conductor 40 is located from the external.

In the present disclosure, the "artificial magnetic conductor character" means a characteristic of a plane where a phase difference between an incident wave and a reflected wave at one resonant frequency is 0 degrees. The antenna body 10 can have an operating frequency in at least one vicinity of at least one resonant frequency. On the plane having the artificial magnetic conductor character, the phase difference between the incident wave and the reflected wave at the operating frequency band is smaller than a range from −90 degrees to +90 degrees.

The base 20 is configured to support the first conductor 40. The outer appearance shape of the base 20 may be substantially rectangular in accordance with the shape of the first conductor 40. The base 20 may include a dielectric material. The relative permittivity of the base 20 may be adjusted as appropriate in accordance with the desired resonant frequency of the antenna body 10.

In the present disclosure, the "dielectric material" may include either a ceramic material or a resin material as a composition. Examples of the ceramic material include an aluminum oxide sintered body, an aluminum nitride sintered body, a mullite-based sintered body, a glass ceramic sintered body, crystallized glass yielded by precipitation of a crystal component in a glass base material, and a microcrystalline sintered body such as mica or aluminum titanate. Examples of the resin material include an epoxy resin, a polyester resin, a polyimide resin, a polyamide-imide resin, a polyetherimide resin, and resin materials yielded by curing an uncured liquid crystal polymer or the like.

As illustrated in FIG. 7, the base 20 includes an upper portion 21, a side wall portion 22, and two pillar portions 23.

However, the base 20 may have one or three or more of pillar portions 23 in accordance with, for example, the size of the antenna body 10. The base 20 may not have the pillar portions 23 in accordance with, for example, the size of the antenna body 10.

The upper portion 21 extends along an XY plane. The upper portion 21 may have a substantially rectangular shape in accordance with the shape of the first conductor 40. However, the upper portion 21 may have any shape in accordance with the shape of the first conductor 40. The upper portion 21 includes two surfaces substantially parallel to the XY plane. One of the two surfaces included in the upper portion 21 faces an outer side of the base 20. The other of the two surfaces faces an inner side of the base 20.

The side wall portion 22 surrounds an outer peripheral portion of the upper portion 21 having the substantially rectangular shape. The side wall portion 22 is connected to the outer peripheral portion of the upper portion 21. The side wall portion 22 extends from the outer peripheral portion of the upper portion 21 toward the second conductor 50 along a Z direction. The region surrounded by the upper portion 21 and the side wall portion 22 is hollow. However, at least a portion of the region surrounded by the upper portion 21 and the side wall portion 22 may be filled with a dielectric material or the like.

The pillar portion 23 is located in the region surrounded by the upper portion 21 and the side wall portion 22. The pillar portion 23 is located between the first conductor 40 and the second conductor 50. The pillar portion 23 is configured to hold a distance between the first conductor 40 and the second conductor 50. The two pillar portions 23 may be configured to hold the distance between the first conductor 40 and the second conductor 50 at different positions from each other. The pillar portion 23 may have a cross shape when viewed from the Z direction.

As illustrated in FIG. 6, the first connection conductor group 30 includes a plurality of first connection conductors 31. In the configuration illustrated in FIG. 6, the first connection conductor group 30 includes two of the first connection conductors 31. However, the first connection conductor group 30 may include any number of the first connection conductors 31 in accordance with, for example, the shape of the first conductor 40.

The plurality of first connection conductors 31 is aligned in the X direction. When the first connection conductor group 30 includes three or more of the first connection conductors 31, distances between the plurality of first connection conductors 31 aligned in the X direction may be substantially equal. The first connection conductor 31 may be disposed along the Z direction. The first connection conductor 31 may be a conductor having a columnar shape. The first connection conductor 31 may be configured such that one end of the first connection conductor 31 is electrically connected to the first conductor 40 and that the other end of the first connection conductor 31 is electrically connected to the second conductor 50.

The second connection conductor group 32 is aligned with the first connection conductor group 30 in the Y direction. The second connection conductor group 32 includes a plurality of second connection conductors 33. In the configuration illustrated in FIG. 6, the second connection conductor group 32 includes two of the second connection conductors 33. However, the second connection conductor group 32 may include any number of the second connection conductors 33 in accordance with, for example, the shape of the first conductor 40.

The plurality of second connection conductors 33 is aligned in the X direction. The distance between the second connection conductors 33 aligned in the X direction may be substantially equal to the distance between the first connection conductors 31 aligned in the X direction. The second connection conductor 33 may be disposed along the Z direction. The second connection conductor 33 may be a conductor having a columnar shape. The second connection conductor 33 may be configured such that one end of the second connection conductor 33 is electrically connected to the first conductor 40 and that the other end of the second connection conductor 33 is electrically connected to the second conductor 50.

The third connection conductor group 34 is aligned with the first connection conductor group 30 and the second connection conductor group 32 in the Y direction. The third connection conductor group 34 includes a plurality of third connection conductors 35. In the configuration illustrated in FIG. 6, the third connection conductor group 34 includes two of the third connection conductors 35. However, the third connection conductor group 34 may include any number of the third connection conductors 35 in accordance with, for example, the shape of the first conductor 40.

The plurality of third connection conductors 35 is aligned in the X direction. The distance between the third connection conductors 35 aligned in the X direction may be substantially equal to at least one of the distance between the first connection conductors 31 aligned in the X direction or the distance between the second connection conductors 33 aligned in the X direction. The third connection conductor 35 may be disposed along the Z direction. The third connection conductor 35 may be a conductor having a columnar shape. The third connection conductor 35 may be configured such that one end of the third connection conductor 35 is electrically connected to the first conductor 40 and that the other end of the third connection conductor 35 is electrically connected to the second conductor 50.

The first conductor 40 is configured to function as a resonator. The first conductor 40 extends along the XY plane. The first conductor 40 is located on the upper portion 21 of the base 20. The first conductor 40 may be located on a surface facing the inner side of the base 20 of the two surfaces that are included in the upper portion 21 and substantially parallel to the XY plane. The first conductor 40 may be a conductor having a flat plate shape. The first conductor 40 may have a substantially rectangular shape. The short side of the first conductor 40 having the substantially rectangular shape is along the X direction. The long side of the first conductor 40 having the substantially rectangular shape is along the Y direction.

The first conductor 40 includes a third conductor 41-1, a third conductor 41-2, and connecting portions **43*a*, 43*b*, 43*c*, 43*d*, 43*e*, and 43*f*. However, the first conductor 40 may not include the connecting portions 43*a*, 43*b*, 43*c*, 43*d*, 43*e*, and 43*f*. Hereinafter, in a case where the third conductor 41-1 and the third conductor 41-2 are not particularly distinguished, these are collectively referred to as the "third conductor 41". The third conductor 41 and the connecting portions 43*a* to 43*f*** may include the same conductive material or different conductive materials.

The third conductor 41 may have a substantially rectangular shape. The third conductor 41 includes four corner portions. The third conductor 41 includes two sides along the X direction and two sides along the Y direction. The third conductor 41-1 has a gap 42-1. The third conductor 41-2 has a gap 42-2. Hereinafter, in a case where the gap 42-1 and the gap 42-2 are not particularly distinguished, these are collectively referred to as the "gap 42". The gap 42 extends from a central portion of one side of the two sides of the third conductor 41 along the Y direction toward a central portion of the other side thereof. The gap 42 extends along the X direction. A portion of the pillar portions 23 on the Z axis positive direction side may be located at a portion at or near the center of the gap 42 extending along the X direction. The width of the gap 42 may be adjusted as appropriate in accordance with the desired operating frequency of the antenna body 10.

The third conductor 41-1 and the third conductor 41-2 are aligned in the Y direction. One side along the X direction on the Y axis positive direction side of the third conductor 41-1 is integrated with one side along the X direction on the Y axis negative direction side of the third conductor 41-2. Two corner portions on the Y axis positive direction side of four corner portions of the third conductor 41-1 are integrated with two corner portions on the Y axis negative direction side of four corner portions of the third conductor 41-2.

The connecting portions 43*a* and 43*b* are located at the respective two corner portions of the third conductor 41-1 on the Y axis negative direction side. The connecting portions 43*a* and 43*b* are each configured to be electrically connected to the first connection conductor 31. The connecting portions 43*a* and 43*b* may have a rounded shape in accordance with the first connection conductor 31. When the first conductor 40 does not include the connecting portions 43*a* and 43*b*, the two corner portions of the third conductor 41-1 on the Y axis negative direction side may be configured to be electrically connected directly to the first connection conductor 31.

The connecting portion 43*c* is located at or near the center of a long side on the X axis positive direction side of two long sides of the first conductor 40. The connecting portion 43*c* is located, on the X axis positive direction side, at a corner portion on the Y axis positive direction side of the third conductor 41-1 and a corner portion on the Y axis negative direction side of the third conductor 41-2 that are integrated. The connecting portion 43*c* is configured to be electrically connected to the second connection conductor 33. The connecting portion 43*c* may have a rounded shape in accordance with the second connection conductor 33. When the first conductor 40 does not include the connecting portion 43*c*, the corner portion on the Y axis positive direction side of the third conductor 41-1 and the corner portion on the Y axis negative direction side of the third conductor 41-2 that are integrated may be configured to be electrically connected directly to the second connection conductor 33.

The connecting portion 43*d* is located at or near the center of a long side on the X axis negative direction side of the two long sides of the first conductor 40. The connecting portion 43*d* is located, on the X axis negative direction side, at the corner portion on the Y axis positive direction side of the third conductor 41-1 and the corner portion on the Y axis negative direction side of the third conductor 41-2 that are integrated. The connecting portion 43*d* is configured to be electrically connected to the second connection conductor 33. The connecting portion 43*d* may have a rounded shape in accordance with the second connection conductor 33. When the first conductor 40 does not include the connecting portion 43*d*, the corner portion on the Y axis positive direction side of the third conductor 41-1 and the corner portion on the Y axis negative direction side of the third conductor 41-2 that are integrated may be configured to be electrically connected directly to the second connection conductor 33.

The connecting portions 43*e* and 43*f* are located at the respective two corner portions on the Y axis positive direction side of the third conductor 41-2. The connecting portions 43*e* and 43*f* are each configured to be electrically connected to the third connection conductor 35. The connecting portions 43*e* and 43*f* may have a rounded shape in accordance with the third connection conductor 35. When the first conductor 40 does not include the connecting portions 43*e* and 43*f*, the two corner portions on the Y axis positive direction side of the third conductor 41-2 may be configured to be electrically connected directly to the third connection conductor 35.

The first conductor 40 is configured to capacitively connect the first connection conductor group 30 to the second connection conductor group 32. For example, the third conductor 41-1 is configured to be electrically connected to the respective first connection conductors 31 by the connecting portions 43*a* and 43*b* and electrically connected to the respective second connection conductors 33 by the connecting portions 43*c* and 43*d*. The first connection conductor 31 and the second connection conductor 33 may be capacitively connected via the gap 42-1 of the third conductor 41-1.

The first conductor 40 is configured to capacitively connect the second connection conductor group 32 to the third connection conductor group 34. For example, the third conductor 41-2 is configured to be electrically connected to the respective second connection conductors 33 by the connecting portions 43*c* and 43*d* and electrically connected to the respective third connection conductors 35 by the connecting portions 43*e* and 43*f*. The second connection conductor 33 and the third connection conductor 35 may be capacitively connected via the gap 42-2 of the third conductor 41-2.

The first conductor 40 is configured to capacitively connect the first connection conductor group 30 to the third connection conductor group 34. For example, the third conductor 41-1 is configured to be electrically connected to the respective first connection conductors 31 by the connecting portions 43*a* and 43*b*. The third conductor 41-2 is configured to be electrically connected to the respective third connection conductors 35 by the connecting portions 43*e* and 43*f*. The first connection conductor group 30 and the third connection conductor group 34 may be capacitively connected via the gap 42-1 of the third conductor 41-1 and the gap 42-2 of the third conductor 41-2.

The second conductor 50 is configured to provide a reference potential for the antenna body 10. The second conductor 50 may be configured to be electrically connected to the ground of a device provided with the antenna body 10. As illustrated in FIG. 5, the second conductor 50 is located on a Z axis negative direction side of the base 20. A variety of parts of the device provided with the antenna body 10 may be located on the Z axis negative direction side of the second conductor 50. The antenna body 10 has the artificial magnetic conductor character described above even when the variety of parts are located on the Z axis negative direction side of the second conductor 50, enabling the radiation efficiency at the operating frequency to be maintained.

As illustrated in FIG. 6, the second conductor 50 extends along the XY plane. The second conductor 50 may be a conductor having a flat plate shape. The second conductor 50 is separated from the first conductor 40 in the Z direction. The second conductor 50 may face the first conductor 40. The second conductor 50 may have a substantially rectangular shape in accordance with the shape of the first conductor 40. However, the second conductor 50 may have any shape in accordance with the shape of the first conductor 40. A short side of the second conductor 50 having the substantially rectangular shape is along the X direction. A long side of the second conductor 50 having the substantially rectangular shape is along the Y direction. The second conductor 50 may have an opening portion 50A in accordance with the structure of the feed line 60.

The second conductor 50 includes a fourth conductor 51-1 and a fourth conductor 51-2. Hereinafter, in a case where the fourth conductor 51-1 and the fourth conductor 51-2 are not particularly distinguished, these are collectively referred to as the "fourth conductor 51".

The fourth conductor 51 may have a substantially rectangular shape. The fourth conductor 51 having the substantially rectangular shape includes four corner portions. The fourth conductor 51-1 faces the third conductor 41-1. The fourth conductor 51-2 faces the third conductor 41-2. One side along the X direction on the Y axis positive direction side of the fourth conductor 51-1 is integrated with one side along the X direction on the Y axis negative direction side of the fourth conductor 51-2. Two corner portions on the Y axis positive direction side of four corner portions of the fourth conductor 51-1 are integrated with two corner portions on the Y axis negative direction side of four corner portions of the fourth conductor 51-2.

The second conductor 50 is electrically connected to the first connection conductor group 30. For example, two corner portions on the Y axis negative direction side of four corner portions of the fourth conductor 51-1 are each configured to be electrically connected to the first connection conductor 31.

The second conductor 50 is configured to be electrically connected to the second connection conductor group 32. For example, on each of the X axis positive direction side and the X axis negative direction side, a corner portion on the Y axis positive direction side of the fourth conductor 51-1 and a corner portion on the Y axis negative direction side of the fourth conductor 51-2 that are integrated are configured to be electrically connected to the second connection conductor 33.

The second conductor 50 is electrically connected to the third connection conductor group 34. For example, two corner portions on the Y axis positive direction side of four corner portions of the fourth conductor 51-2 are each configured to be electrically connected to the third connection conductor 35.

A portion of the feed line 60 is along the Z direction. The feed line 60 may be a conductor having a columnar shape. A portion of the feed line 60 may be located in the region surrounded by the upper portion 21 and the side wall portion 22.

The feed line 60 is electromagnetically connected to the first conductor 40. In the present disclosure, the "electromagnetic connection" may be an electrical connection or a magnetic connection. For example, one end of the feed line 60 may be electrically connected to the first conductor 40. The other end of the feed line 60 may extend externally from the opening portion 50A of the second conductor 50 illustrated in FIG. 6. The other end of the feed line 60 may be electrically connected to an external device or the like.

The feed line 60 supplies electrical power to the first conductor 40. The feed line 60 supplies the electrical power from the first conductor 40 to an external device or the like.

Figure 8:
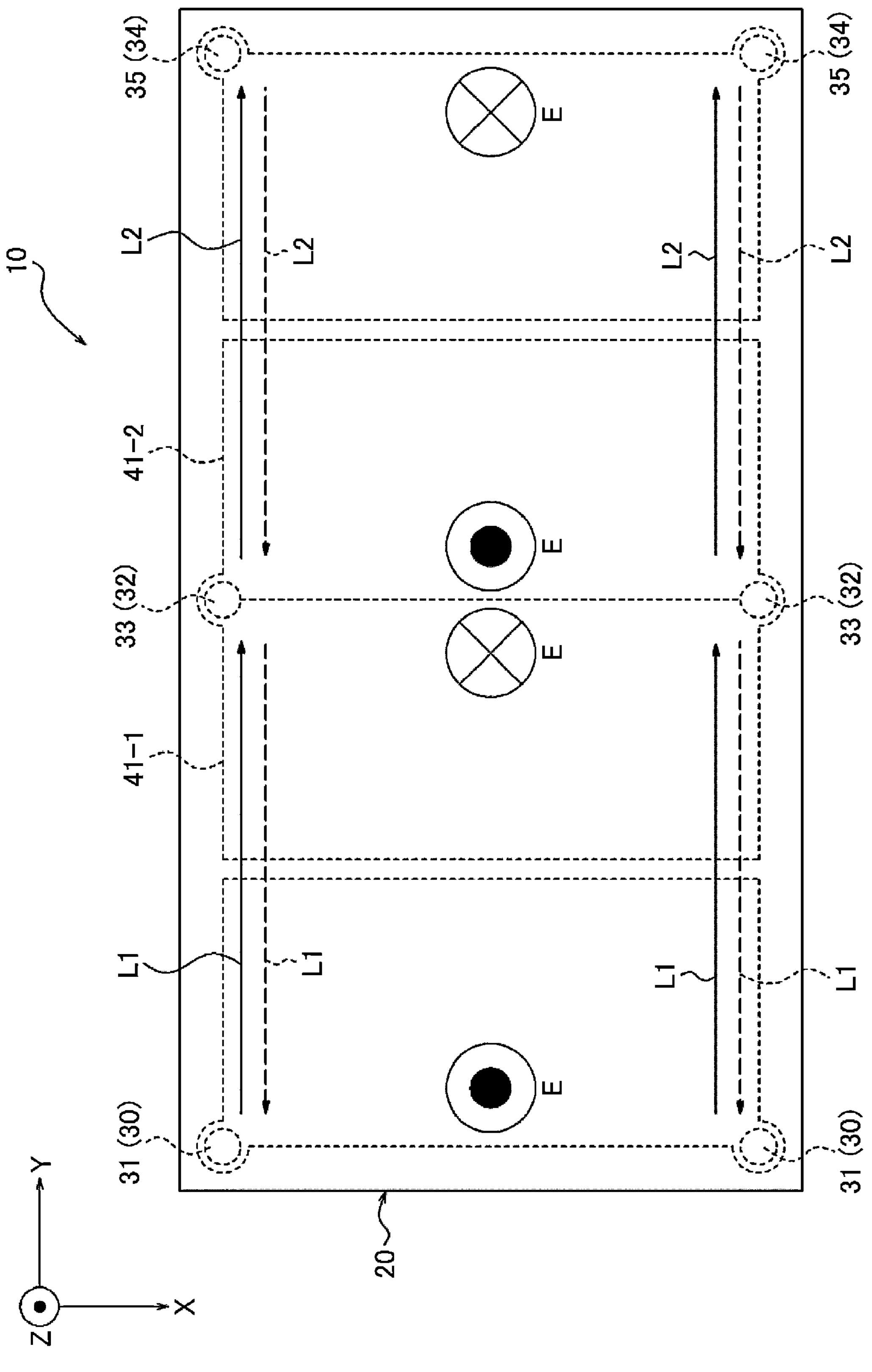
FIG. 8 is a plan view schematically illustrating electrical currents and an electrical field when an electromagnetic wave in a first frequency band is radiated.
Figure 9:
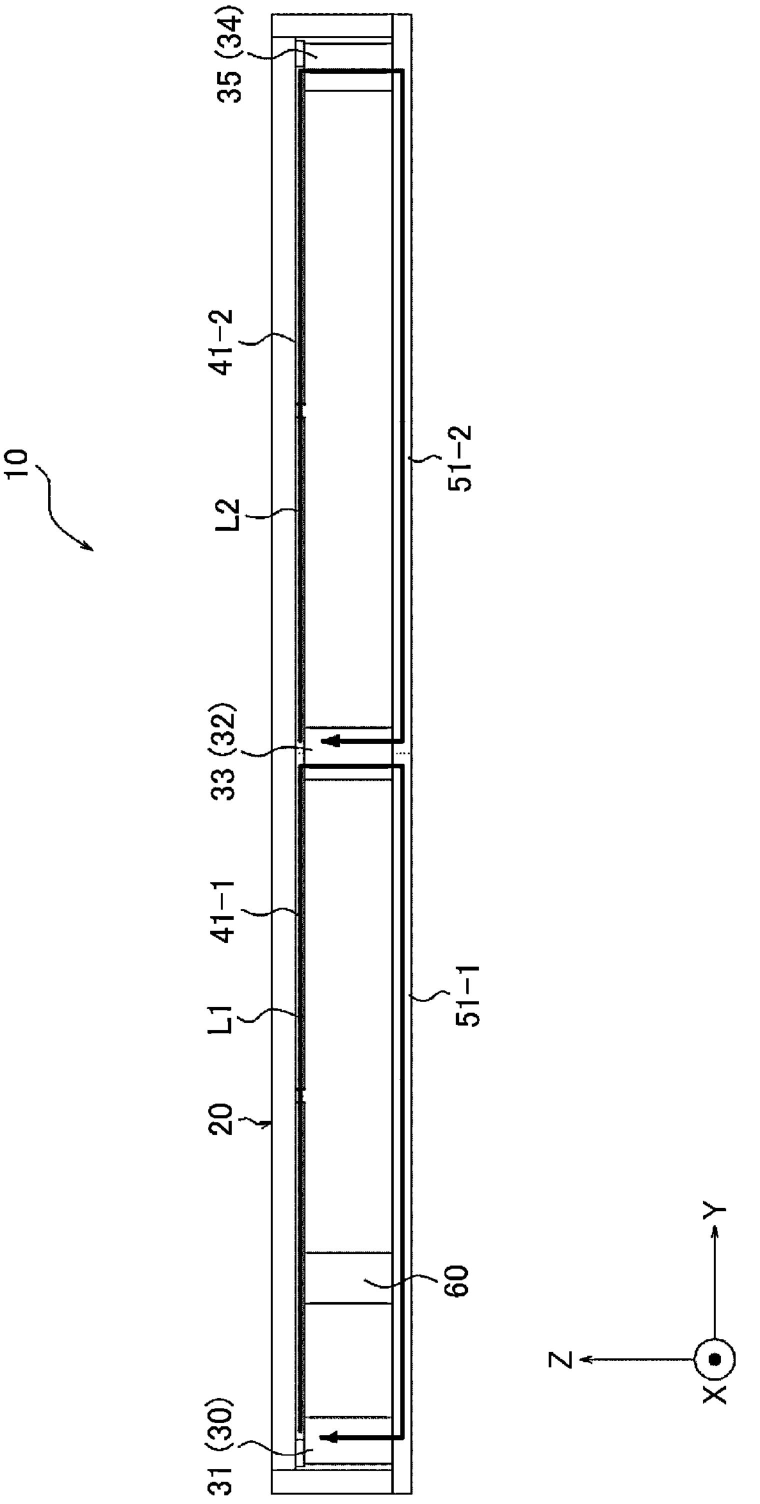
FIG. 9 is a cross-sectional view of the state illustrated in FIG. 8.

FIG. 8 is a plan view schematically illustrating electrical currents L1 and L2, and an electrical field E when the electromagnetic wave in the first frequency band is radiated. FIG. 8 illustrates the orientations of the electrical field E when viewed from the Z axis positive direction side at a given moment. In FIG. 8, the electrical currents L1 and L2 each denoted by a solid line represent the orientations of the electrical currents flowing through the first conductor 40 when viewed from the Z axis positive direction side at a given moment. The electrical currents L1 and L2 each denoted by a dotted line represent the orientations of the electrical currents flowing through the second conductor 50 when viewed from the Z axis positive direction side at a given moment. FIG. 9 is a cross-sectional view of the state illustrated in FIG. 8.

Appropriately supplying electrical power from the feed line 60 to the first conductor 40 may excite the electrical current L1 and the electrical current L2. The antenna body 10 emits the electromagnetic wave in the first frequency band by the electrical current L1 and the electrical current L2. The first frequency band is one of the operating frequency bands of the antenna body 10.

The electrical current L1 may be a loop electrical current flowing along a first loop. The first loop may include the first connection conductor group 30, the second connection conductor group 32, the first conductor 40, and the second conductor 50. For example, the first loop may include the first connection conductor 31, the second connection conductor 33, the third conductor 41-1, and the fourth conductor 51-1.

The electrical current L2 may be a loop electrical current flowing along a second loop. The second loop may include the second connection conductor group 32, the third connection conductor group 34, the first conductor 40, and the second conductor 50. For example, the second loop may include the second connection conductor 33, the third connection conductor 35, the third conductor 41-2, and the fourth conductor 51-2.

The orientation of the electrical current L1 flowing through a corresponding portion in the first loop may be identical to the orientation of the electrical current L2 flowing through a corresponding portion in the second loop. For example, the second connection conductor 33 included in the first loop and the third connection conductor 35 included in the second loop are corresponding portions. As illustrated in FIG. 9, at a given moment, the orientation of the electrical current L1 flowing through the second connection conductor 33 included in the first loop and the orientation of the electrical current L2 flowing through the third connection conductor 35 included in the second loop may be the same Z axis negative direction. The first connection conductor 31 included in the first loop and the second connection conductor 33 included in the second loop are also corresponding portions. At a given moment, the orientation of the electrical current L1 flowing through the first connection conductor 31 included in the first loop and the orientation of the electrical current L2 flowing through the second connection conductor 33 included in the second loop may be the same Z axis positive direction.

By making the orientation of the electrical current L1 flowing through the corresponding portion in the first loop identical to the orientation of the electrical current L2 flowing through the corresponding portion in the second loop, the orientation of the electrical current L1 flowing through the second connection conductor 33 in the first loop may be opposite to the orientation of the electrical current L2 flowing through the second connection conductor 33 of the second loop. For example, when the orientation of the electrical current L1 flowing through the second connection conductor 33 included in the first loop is the Z axis negative direction at a given moment, the orientation of the electrical current L2 flowing through the second connection conductor 33 included in the second loop may be the Z axis positive direction. By making the orientations of the electrical current L1 and the electrical current L2 that flow through the second connection conductor 33 opposite to each other, as illustrated in FIG. 8, the orientation of the electric field at or near the second connection conductor group 32 generated by the electrical current L1 may be opposite to the orientation of the electric field at or near the second connection conductor group 32 generated by the electrical current L2. By making the orientations of the two electrical fields opposite to each other, the electric field at or near the second connection conductor group 32 generated by the electrical current L1 and the electric field at or near the second connection conductor group 32 generated by the electrical current L2 may be offset macroscopically.

By making the orientation of the electrical current L1 flowing through the corresponding portion in the first loop identical to the orientation of the electrical current L2 flowing through the corresponding portion in the second loop, the electrical current L1 and the electrical current L2 may be viewed as one macroscopic loop electrical current. This macroscopic loop electrical current may be viewed as flowing along a loop including the first connection conductor group 30, the third connection conductor group 34, the first conductor 40, and the second conductor 50. The electrical field at or near the first connection conductor group 30 generated by this macroscopic loop electrical current may be opposite to the electrical field at or near the third connection conductor group 34 generated by this macroscopic loop electrical current. For example, as illustrated in FIG. 8, when the orientation of the electric field at or near the first connection conductor group 30 is the Z axis positive direction, the orientation of the electric field at or near the third connection conductor group 34 may be the Z axis negative direction.

The macroscopic loop electrical current may cause the first connection conductor group 30 and the third connection conductor group 34 to function as a pair of electrical walls when viewed from the first conductor 40 as a resonator. Further, the macroscopic loop electrical current may cause a YZ plane on the X axis positive direction side and a YZ plane on the X axis negative direction side to function as a pair of magnetic walls when viewed from the first conductor 40 as a resonator. Surrounding the first conductor 40 by such a pair of electrical walls and such a pair of magnetic walls causes the antenna body 10 to enter a mode exhibiting the artificial magnetic conductor character with respect to the electromagnetic wave in the first frequency band incident on the first conductor 40 from the external (first mode).

Figure 10:
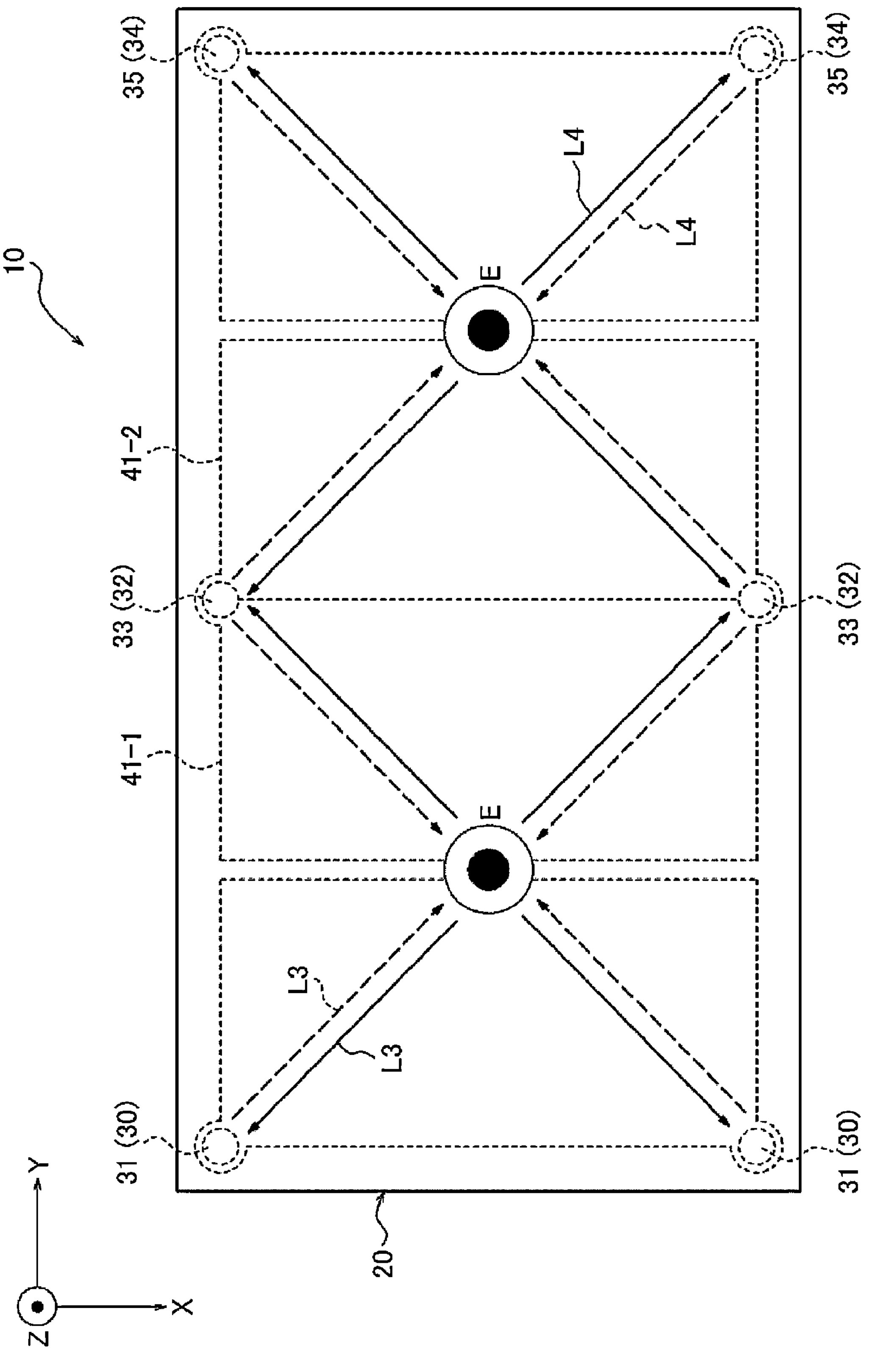
FIG. 10 is a plan view schematically illustrating electrical currents and an electrical field when the electromagnetic wave in a second frequency band is radiated.
Figure 11:
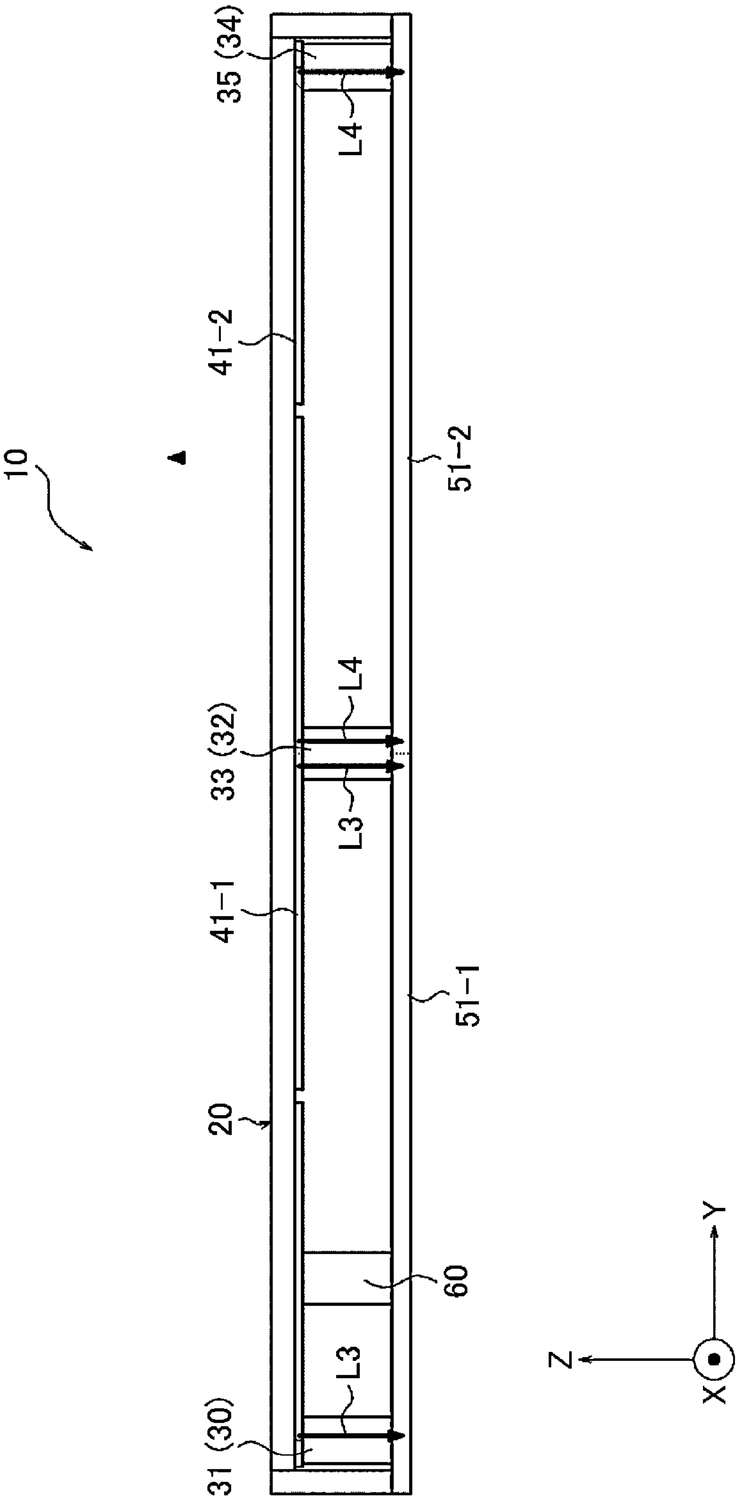
FIG. 11 is a cross-sectional view of the state illustrated in FIG. 10.

FIG. 10 is a plan view schematically illustrating electrical currents L3, L4, and the electrical field E when the electromagnetic wave in the second frequency band is radiated. FIG. 10 illustrates the orientations of the electrical field E when viewed from the Z axis positive direction side at a given moment. In FIG. 10, the electrical currents L3 and L4 each denoted by a solid line represent the orientations of the electrical currents flowing through the first conductor 40 when viewed from the Z axis positive direction side at a given moment. The electrical currents L3 and L4 each denoted by a dotted line represent the orientations of the electrical currents flowing through the second conductor 50 when viewed from the Z axis positive direction side at a given moment. FIG. 11 is a cross-sectional view of the state illustrated in FIG. 10.

Appropriately supplying electrical power from the feed line 60 to the first conductor 40 may excite the electrical current L3 and the electrical current L4 in the second frequency band. The second frequency band may be one of the operating frequency bands of the antenna body 10. Frequencies belonging to the second frequency band are higher than frequencies belonging to the first frequency band.

At a given moment, the electrical current L3 may flow through the third conductor 41-1 from a vicinity of the center of the third conductor 41-1 toward each of four corner portions of the third conductor 41-1. At a different moment, the electrical current L3 may flow through the third conductor 41-1 from each of the four corner portions of the third conductor 41-1 toward the vicinity of the center of the third conductor 41-1.

At a given moment, the electrical current L3 may flow through the fourth conductor 51-1 from each of four corner portions of the fourth conductor 51-1 toward a vicinity of the center of the fourth conductor 51-1. At a different moment, the electrical current L3 may flow through the fourth conductor 51-1 from the vicinity of the center of the fourth conductor 51-1 toward each of the four corner portions of the fourth conductor 51-1.

The orientation of the electrical current L3 flowing through the first connection conductor 31 may be identical to the orientation of the electrical current L3 flowing through the second connection conductor 33. For example, as illustrated in FIG. 11, when the orientation of the electrical current L3 flowing through the first connection conductor 31 is the Z axis negative direction at a given moment, the orientation of the electrical current L3 flowing through the second connection conductor 33 may be the Z axis negative direction. At a different moment, when the orientation of the electrical current L3 flowing through the first connection conductor 31 is the Z axis positive direction, the orientation of the electrical current L3 flowing through the second connection conductor 33 may be the Z axis positive direction.

The third conductor 41-1, the fourth conductor 51-1, the first connection conductors 31, and the second connection conductors 33 may constitute a first dielectric resonator. The first dielectric resonator may, with the electrical current L3 excited, resonate in a transverse magnetic (TM) mode (second mode), which is a resonant mode of a dielectric resonator.

At a given moment, the electrical current L4 may flow through the third conductor 41-2 from a vicinity of the center of the third conductor 41-2 toward each of four corner portions of the third conductor 41-2. At a different moment, the electrical current L4 may flow through the third conductor 41-2 from each of the four corner portions of the third conductor 41-2 toward the vicinity of the center of the third conductor 41-2.

At a given moment, the electrical current L4 may flow through the fourth conductor 51-2 from each of four corner portions of the fourth conductor 51-2 toward a vicinity of the center of the fourth conductor 51-2. At a different moment, the electrical current L4 may flow through the fourth conductor 51-2 from the vicinity of the center of the fourth conductor 51-2 toward each of the four corner portions of the fourth conductor 51-2.

The orientation of the electrical current L4 flowing through the second connection conductor 33 and the orientation of the electrical current L4 flowing through the third connection conductor 35 may be the same. For example, as illustrated in FIG. 11, when the orientation of the electrical current L4 flowing through the second connection conductor 33 is the Z axis negative direction at a given moment, the orientation of the electrical current L4 flowing through the third connection conductor 35 may be the Z axis negative direction. At a different moment, when the orientation of the electrical current L4 flowing through the second connection conductor 33 is the Z axis positive direction, the orientation of the electrical current L4 flowing through the third connection conductor 35 may be the Z axis positive direction.

The third conductor 41-2, the fourth conductor 51-2, the second connection conductors 33, and the third connection conductors 35 may constitute a second dielectric resonator. The second dielectric resonator may, with the electrical current L4 excited, resonate in the TM mode, which is a resonant mode of a dielectric resonator.

The antenna body 10 is configured to emit the electromagnetic wave in the second frequency band by making the orientation of the electrical current flowing through the first connection conductor group 30, the orientation of the electrical current flowing through the second connection conductor group 32, and the orientation of the electrical current flowing through the third connection conductor group 34 identical to one another. For example, the orientation of the electrical current L3 flowing through the first connection conductor 31 and the second connection conductor 33 and the orientation of the electrical current L4 flowing through the second connection conductor 33 and the third connection conductor 35 may be the same. Such a configuration may make the orientation of the electric field on the third conductor 41-1 generated by the electrical current L3 identical to the orientation of the electric field on the third conductor 41-2 generated by the electrical current L4 in the second frequency band.

The antenna body 10 serves as a dielectric resonator antenna in the second frequency band. In the second frequency band, the first dielectric resonator and the second dielectric resonator may resonate in a TM mode of dielectric resonators in the same phase.

Figure 12:
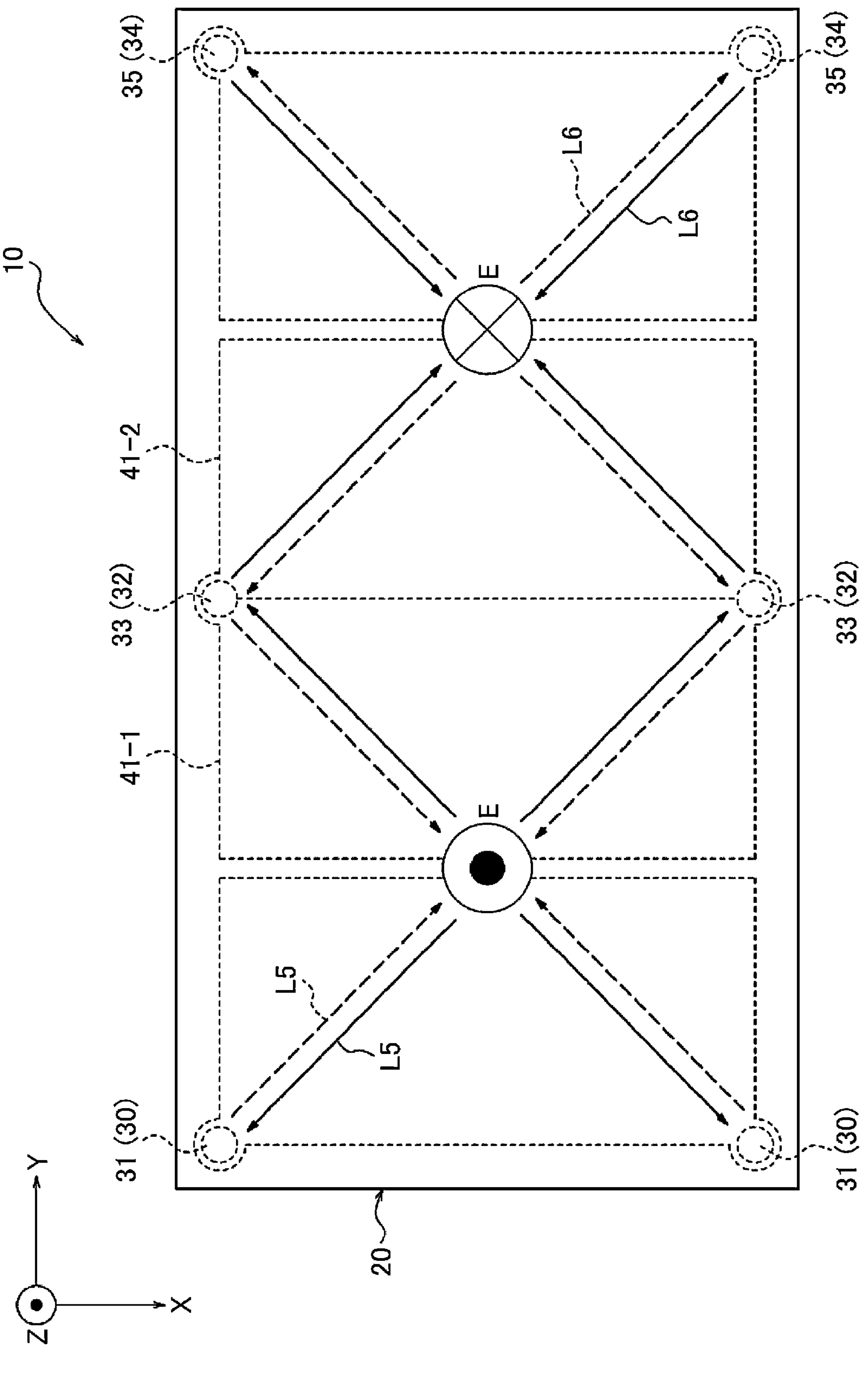
FIG. 12 is a plan view schematically illustrating electrical currents and an electrical field when the electromagnetic wave in a third frequency band is radiated.
Figure 13:
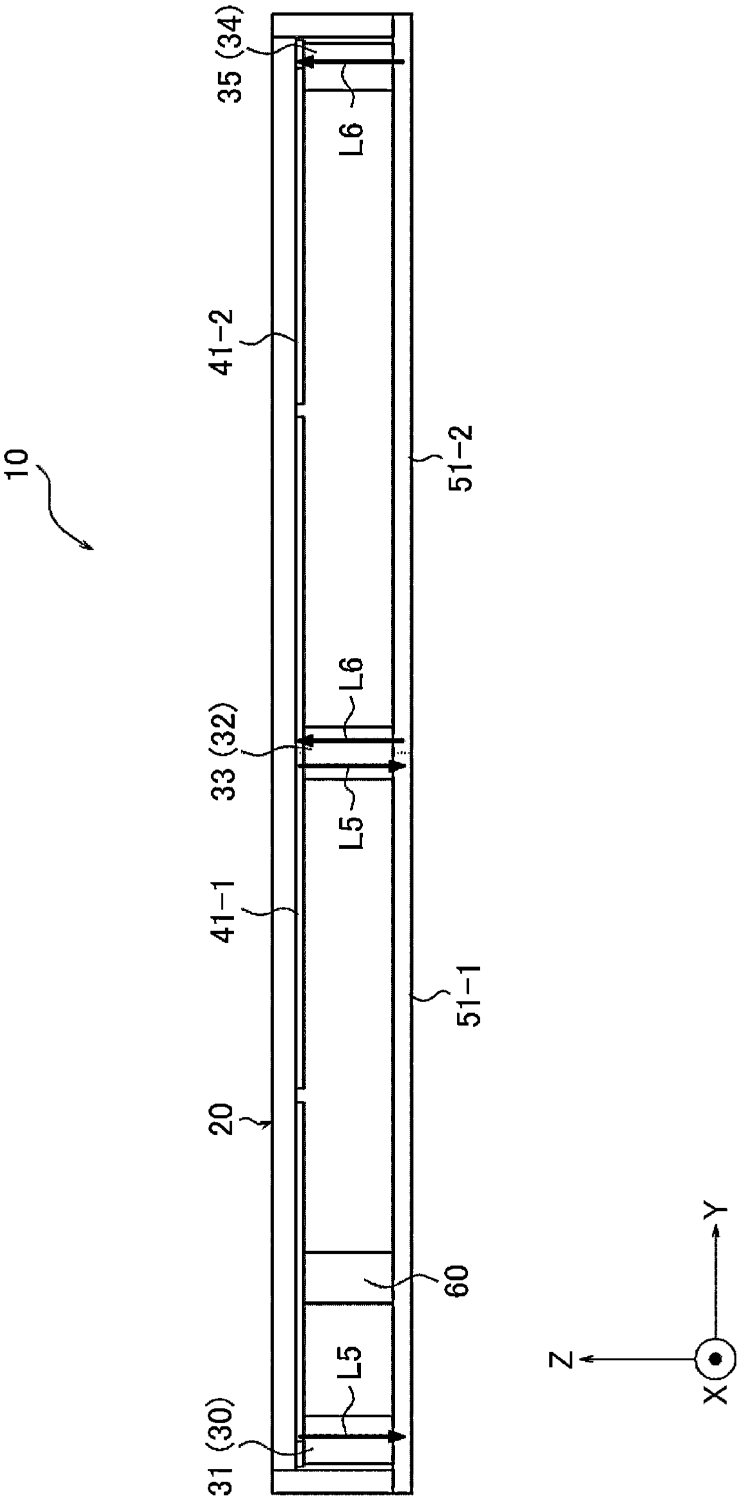
FIG. 13 is a cross-sectional view of the state illustrated in FIG. 12.

FIG. 12 is a plan view schematically illustrating electrical currents LS, L6, and the electrical field E when the electromagnetic wave in the third frequency band is radiated. FIG. 12 illustrates the orientations of the electrical field E when viewed from the Z axis positive direction side at a given moment. In FIG. 12, the electrical currents L5 and L6 each denoted by a solid line represent the orientations of the electrical currents flowing through the first conductor 40 when viewed from the Z axis positive direction side at a given moment. The electrical currents L5 and L6 each denoted by a dotted line represent the orientations of the electrical currents flowing through the second conductor 50 when viewed from the Z axis positive direction side at a given moment. FIG. 13 is a cross-sectional view of the state illustrated in FIG. 12.

Electrical power may be supplied as appropriate from the feed line 60 to the first conductor 40 to excite the electrical current L5 and the electrical current L6 in the third frequency band. The third frequency band is one of the operating frequency bands of the antenna body 10. Frequencies belonging to the third frequency band are higher than the frequencies belonging to the first frequency band. The third frequency band may be higher than the second frequency band depending on the configuration of the antenna body 10 or the like.

As with the electrical current L3 illustrated in FIG. 10, the electrical current L5 may flow through the third conductor 41-1, the fourth conductor 51-1, the first connection conductor 31, and the second connection conductor 33. The first dielectric resonator may, with the electrical current L5 excited, resonate in the TM mode, which is a resonant mode of a dielectric resonator.

As with the electrical current L4 illustrated in FIG. 10, the electrical current L6 may flow through the third conductor 41-2, the fourth conductor 51-2, the second connection conductor 33, and the third connection conductor 35. However, the orientation of the electrical current L6 flowing through the second connection conductor 33 and the third connection conductor 35 is opposite to the orientation of the electrical current L5 flowing through the first connection conductor 31 and the second connection conductor 33. The second dielectric resonator may, with the electrical current L6 excited, resonate in a TM mode in an opposite phase from the first dielectric resonator.

The antenna body 10 is configured to emit the electromagnetic wave in the third frequency band by making the orientation of the electrical current flowing through the first connection conductor group 30 opposite to the orientation of the electrical current flowing through the third connection conductor group 34. For example, the orientation of the electrical current L5 flowing through the first connection conductor 31 and the second connection conductor 33 may be opposite to the orientation of the electrical current flowing through the second connection conductor 33 and the third connection conductor 35. Such a configuration may make the orientation of the electric field on the third conductor 41-1 generated by the electrical current L5 opposite to the orientation of the electric field on the third conductor 41-2 generated by the electrical current L6.

The antenna body 10 serves as a dielectric resonator antenna in the third frequency band. In the third frequency band, the first dielectric resonator and the second dielectric resonator may resonate in a TM mode of dielectric resonators in an opposite phase from each other.

Next, the housing case 13 will be described with reference to FIG. 3 and FIG. 4. The housing case 13 is formed using metal. The metal may be iron or stainless steel and is not particularly limited. The housing case 13 includes a bottom plate 71, a side wall 72, and a flange 73. The housing case 13 is formed in a shape of a box having an opening. The opening of the housing case 13 is formed on the side of the surface where the first conductor 40 of the antenna body 10 is located. In other words, the opening of the housing case 13 is formed on the face on the side through which the electromagnetic wave enters and exits.

The antenna body 10 is installed on the bottom plate 71. The bottom plate 71 is formed in a substantially rectangular shape in accordance with the shape of the antenna body 10. However, the bottom plate 71 may have any shape in accordance with the shape of the antenna body 10.

The side wall 72 is provided to stand from the bottom plate 71 and in the periphery of the antenna body 10 with a distance from the antenna body 10. The side wall 72 is provided at four sides, in accordance with the bottom plate 71 having a substantially rectangular shape, and the side walls 72 at the four sides are arranged in a frame shape. Note that it suffices if at least one side wall 72 is provided. The side wall 72 is not particularly limited as being provided at four side to form a frame shape and may be formed in a cylindrical shape surrounding the periphery of the antenna body 10.

The flange 73 is provided on the opening side of the side wall 72 and is provided outward from the side wall 72. The flange 73 is formed in a flat plate shape and has an opening at the center portion. The cover 14 is attached to the flange 73.

In the housing case 13, a distance D between the antenna body 10 and the side wall 72 in the X direction and the Y direction is λ/8 or more, where 2 is the wavelength of the electromagnetic wave transmitted to and received from the antenna body 10. More preferably, the distance in the X direction and the Y direction between the antenna body 10 and the side wall 72 is λ/4. Here, the electromagnetic wave is in a frequency band for transmission and reception in the TM mode, the frequency band being a 2 GHz band, for example. The wavelength λ of the electromagnetic wave at the center frequency in the 2 GHz band is, for example, approximately 16 cm. Therefore, λ/4, which is the distance between the antenna body 10 and the side wall 72, is approximately 40 mm.

The cover 14 closes the opening of the housing case 13. A material including resin is used for the cover 14 that is formed in a flat plate shape. The cover 14 is fixed to the flange 73 by a fastening member such as a screw.

The RF module 12 is disposed in a corner portion of the housing case 13. The RF module 12 may be configured to control electrical power fed to the antenna body 10. The RF module 12 is configured to modulate a baseband signal and supply the resultant signal to the antenna body 10. The RF module 12 may be configured to modulate an electrical signal received by the antenna body 10 into a baseband signal.

The wireless communication module 120 is provided to have the surface, on the opening side of the housing case 13, included in the front of the package receiving box 110. Thus, the wireless communication module 120 can transmit and receive the electromagnetic wave on the front side that is the open space side. Note that the wireless communication module 120 may be provided to have the surface, on the opening side of the housing case 13, included in the top face of the package receiving box 110.

Figure 14:
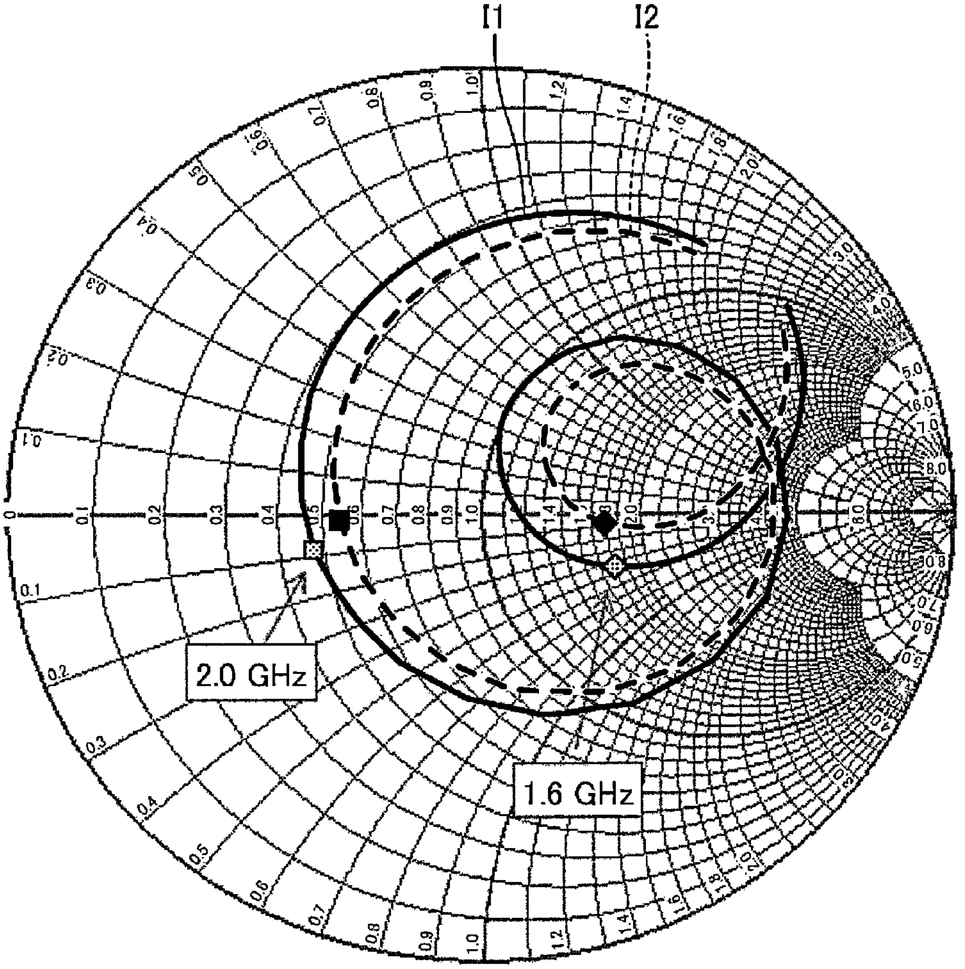
FIG. 14 is a diagram illustrating the input impedance of the antenna.

Next, input impedance of the antenna 1 will be described with reference to FIG. 14. FIG. 14 is a diagram illustrating input impedance of the antenna. FIG. 14 is what is known as the Smith chart. In FIG. 14, I1 indicates the input impedance of the antenna 1 not housed in the housing case 13, and 12 indicates the input impedance of the antenna 1 housed in the housing case 13 of the present disclosure. The trajectory of the input impedance 12 is smaller than that of the input impedance I1. For example, when the input impedance I1 and the input impedance I2 when the frequency of the electromagnetic wave is 2.0 GHz are compared, the input impedance I1 is smaller than the input impedance I2. When the input impedance I1 and the input impedance I2 when the frequency of the electromagnetic wave is 1.6 GHz are compared, the input impedances I1 and I2 are substantially the same.

Figure 15:
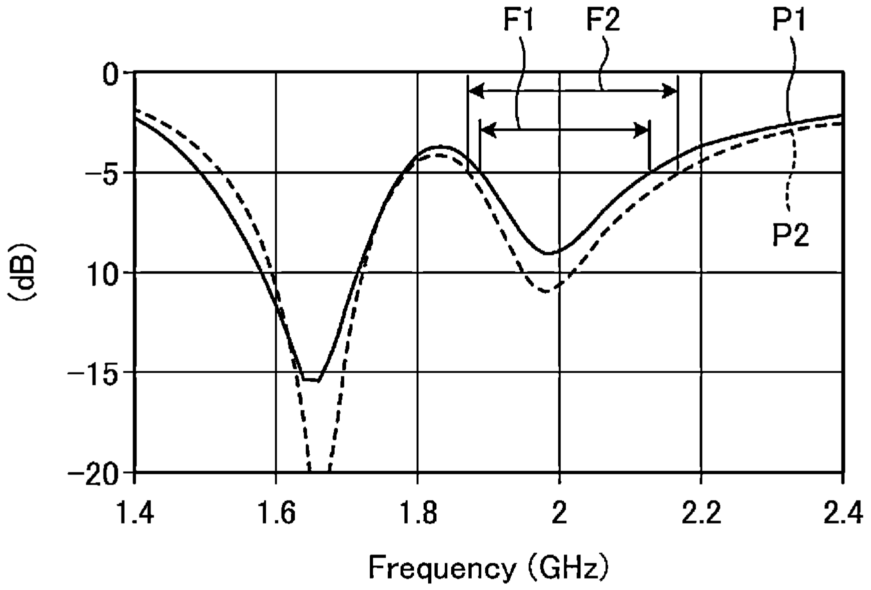
FIG. 15 is a graph showing an example of reflection characteristics with respect to a frequency of the antenna.

Next, with reference to FIG. 15, the reflection characteristics of the antenna 1 will be described. FIG. 15 is a graph showing an example of reflection characteristics with respect to the frequency of the antenna. In FIG. 15, the horizontal axis represents the frequency of the electromagnetic wave, and the vertical axis represents the reflection coefficient. In FIG. 15, P1 indicates the reflection coefficient of the antenna 1 not housed in the housing case 13, and P2 indicates the reflection coefficient of the antenna 1 housed in the housing case 13 of the present disclosure. For example, when the frequency that is the attenuation pole of the electromagnetic wave is 2.0 GHz, the frequency bands achieving, respectively with P1 and P2, a reflection coefficient smaller than −5 (dB) are a frequency band F1 and a frequency band F2. When compared with the frequency band F1, the frequency band F2 is wider than the frequency band F1.

Figure 16:
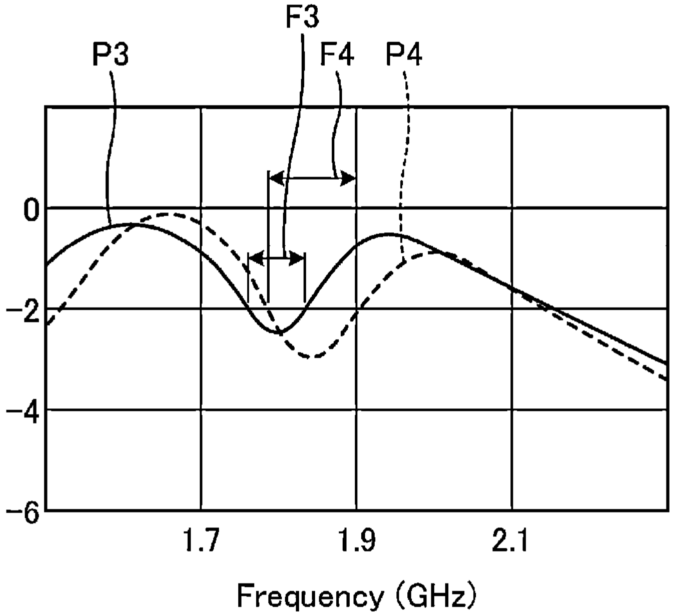
FIG. 16 is a graph showing an example of reflection characteristics with respect to a frequency of the antenna.

Next, with reference to FIG. 16, the reflection characteristics of the antenna 1 will be described. FIG. 16 is a graph showing an example of reflection characteristics with respect to the frequency of the antenna. The horizontal axis and the vertical axis in FIG. 16 respectively represent the frequency of the electromagnetic wave and reflection coefficient. In FIG. 16, P3 indicates the reflection coefficient of the antenna 1 housed in the housing case 13 of the present disclosure and not closed by the cover 14, and P4 indicates the reflection coefficient of the antenna 1 housed in the housing case 13 of the present disclosure and closed by the cover 14. For example, when the frequency that is the attenuation pole of the electromagnetic wave is 2.0 GHz, the frequency bands achieving, respectively with P3 and P4, a reflection coefficient smaller than −2 (dB) are a frequency band F3 and a frequency band F4. When compared with the frequency band F3, the frequency band F4 is wider than the frequency band F3.

Figure 17:
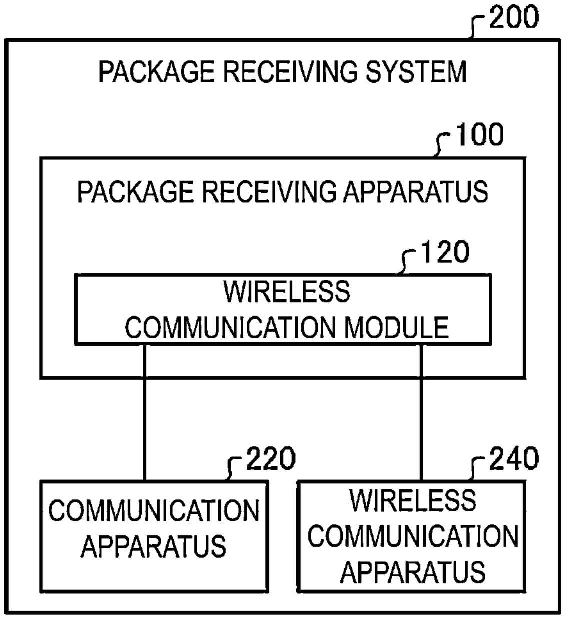
FIG. 17 is a diagram illustrating a package receiving system including a package receiving apparatus according to the embodiment.

Next, a package receiving system 200 will be described with reference to FIG. 17. FIG. 17 is a diagram illustrating a package receiving system including a package receiving apparatus according to the embodiment. The package receiving system 200 according to the embodiment includes the package receiving apparatus 100 and a communication apparatus 220. The communication apparatus 220 receives information transmitted from the package receiving apparatus 100 via the wireless communication module 120. The communication apparatus 220 may wirelessly communicate directly with the package receiving apparatus or may communicate with the package receiving apparatus via a wireless base station or the like. The communication apparatus 220 may not have a wireless communication function. The communication apparatus 220 may be, for example, a server or the like. The communication apparatus 220 may be on a cloud coupling a plurality of servers or the like. The communication apparatus 220 is managed, for example, by a service operator that operates the system.

The package receiving system 200 may include a wireless communication apparatus 240. The wireless communication apparatus 240 receives information on the package receiving apparatus 100. The wireless communication apparatus 240 may provide information on the package receiving apparatus 100. The wireless communication apparatus 240 may be a wireless communication apparatus for a deliverer. The wireless communication apparatus 240 may receive information on a package housed in the package receiving apparatus 100. The wireless communication apparatus 240 may provide information on a package stored in the package receiving apparatus 100. The wireless communication apparatus 240 may be a wireless communication apparatus for the receiver. The wireless communication apparatus 240 may include a wireless communication apparatus for one or a plurality of deliverers, and a wireless communication apparatus for one or a plurality of receivers. The wireless communication apparatus 240 may be the communication apparatus 220. The wireless communication apparatus 240 may wirelessly communicate with the receiver of the package directly.

As described above, in the antenna 1 according to the embodiment, housing the antenna body 10 in the housing case 13 that is made of metal and includes the bottom plate 71 and the side wall 72 allows the input impedance of the antenna body 10 to be reduced, enabling a wider bandwidth of the antenna body 10 to be achieved.

Furthermore, in the antenna 1 according to the embodiment, setting the distance between the antenna body 10 and the side wall 72 to λ/8 or more, more preferably λ/4, allows the input impedance of the antenna body 10 to be appropriately reduced, enabling a wider bandwidth of the antenna body 10 to be appropriately achieved.

Furthermore, in the antenna 1 according to the embodiment, providing the cover 14 that is made of resin and configured to close the opening of the housing case 13 allows a further wider bandwidth of the antenna body 10 to be achieved.

Furthermore, with the wireless communication module 120 according to the embodiment, wireless communications can be performed using the antenna 1 having high antenna efficiency.

Furthermore, with the package receiving apparatus 100 according to the embodiment, wireless communications can be favorably performed with the outside by using the wireless communication module 120.

With the package receiving apparatus 100 according to the embodiment, the antenna 1 opening side face of the wireless communication module 120 can be the front of the package receiving box 110. Thus, the electromagnetic wave can be transmitted and received on the open space side, whereby the occurrence of communication failure due an electromagnetic wave shielding object can be suppressed.

The package receiving system 200 according to the embodiment can transmit and receive various types of information between the package receiving apparatus 100 and the communication apparatus 220 and between the package receiving apparatus 100 and the wireless communication apparatus 240.

The invention claimed is:

1. An antenna, comprising:
- an antenna body configured to enter a first mode exhibiting an artificial magnetic conductor character with respect to a first electromagnetic wave in a first frequency band and enter a second mode serving as a resonator for a second electromagnetic wave in a second frequency band higher than the first frequency band; and
- a housing case including a bottom plate on which the antenna body is installed and a side wall provided standing from the bottom plate and spaced with a distance from a periphery of the antenna body, the housing case being made of metal and comprising an opening in a face through which the first electromagnetic wave or the second electromagnetic wave enters and exits.

2. The antenna according to claim 1, wherein
- the distance between the antenna body and the side wall is λ/8 or more, where λ is a wavelength of the second electromagnetic wave.

3. The antenna according to claim 2, wherein
- the distance between the antenna body and the side wall is λ/4.

4. The antenna according to claim 1, further comprising a cover made of resin and configured to close the opening of the housing case.

5. A wireless communication module, comprising:
- an antenna, comprising:
  - an antenna body configured to enter a first mode exhibiting an artificial magnetic conductor character with respect to a first electromagnetic wave in a first frequency band and enter a second mode serving as a resonator for a second electromagnetic wave in a second frequency band higher than the first frequency band; and
  - a housing case including a bottom plate on which the antenna body is installed and a side wall provided standing from the bottom plate and spaced with a distance from a periphery of the antenna body, the housing case being made of metal and comprising an opening in a face through which the first electromagnetic wave or the second electromagnetic wave enters and exits; and
- an RF module housed in the housing case and electrically connected to the antenna body.

6. A package receiving apparatus, comprising:
- a wireless communication module;
- a package receiving box provided with the wireless communication module and configured to house a package; and
- a controller electrically connected to the wireless communication module and configured to manage the package housed in the package receiving box,
- wherein the wireless communication module comprises:
- an antenna, comprising:
  - an antenna body configured to enter a first mode exhibiting an artificial magnetic conductor character with respect to a first electromagnetic wave in a first frequency band and enter a second mode serving as a resonator for a second electromagnetic wave in a second frequency band higher than the first frequency band; and
  - a housing case including a bottom plate on which the antenna body is installed and a side wall provided standing from the bottom plate and spaced with a distance from a periphery of the antenna body, the housing case being made of metal and comprising an opening in a face through which the first electromagnetic wave or the second electromagnetic wave enters and exits; and
- an RF module housed in the housing case and electrically connected to the antenna body.

7. The package receiving apparatus according to claim 6, wherein
- the wireless communication module is provided with a face on a side of the opening of the antenna facing a front of the package receiving box.

8. A package receiving system, comprising:
- the package receiving apparatus according to claim 6; and
- a communication apparatus configured to receive package information wirelessly transmitted from the package receiving apparatus.

9. The package receiving system according to claim 8, wherein
- the communication apparatus is a wireless communication apparatus.

10. The package receiving system according to claim 8 further, comprising:
- a wireless communication apparatus configured to receive information transmitted from the communication apparatus.

* * * * *